# 3,118,771
CONDIMENT COMPOSITION AND METHOD OF PRODUCTION

James J. Albrecht, Chicago, Ill., assignor to International Minerals & Chemical Corporation, a corporation of New York
No Drawing. Filed Sept. 14, 1960, Ser. No. 55,839
7 Claims. (Cl. 99—140)

This invention relates to a condiment composition. In one of its aspects, this invention relates to a solid free-flowing condiment composition containing monosodium glutamate which is especially useful in seafoods and vegetables such as broccoli, asparagus, Brussels sprouts, spinach, and beets. In another of its aspects, this invention relates to a method for preparing a solid free-flowing condiment composition.

The use of monosodium glutamate as a flavor-enhancing agent has enjoyed considerable success, not only in commercial food processing, but also in the home kitchen and in the back yard barbecue pit. It has found its greatest acceptance with meats, poultry, and certain vegetables such as peas, corn, and beans. There are certain areas, however, where monosodium glutamate has not been particularly effective. For example, it is believed that monosodium glutamate enhances the "fishy" note in most seafoods. Similarly, monosodium glutamate has never been considered to be overly effective when used in conjunction with certain vegetables, as for example, broccoli, asparagus, Brussels sprouts, spinach, and beets. In accordance with the present invention, I have provided a unique condiment composition containing as its major ingredient monosodium glutamate, which is particularly effective on seafoods and the above mentioned vegetables. Further, I have found that the use of my condiment composition with seafood produces a more desirable taste than with comparable ingredients used separately at the same level of intensity.

It is, therefore, an object of the present invention to provide a unique condiment composition.

It is another object of this invention to provide a condiment composition containing monosodium glutamate as a major ingredient which is useful on seafoods and on vegetables where monosodium glutamate has in the past not been considered to be effective.

It is a further object of this invention to provide a unique condiment composition in solid, free-flowing form, having a reasonable shelf life when packaged in conventional recloseable containers.

It is still another object of this invention to provide a method for producing a unique solid, free-flowing condiment composition.

The accomplishment of these and additional objects will be apparent from the description which follows.

The condiment composition of the present invention consists of an intimate, homogeneous mixture of the following ingredients in the approximate proportions by weight given:

|  | Weight percent |
|---|---|
| Monosodium glutamate | 53 to 88 |
| Citric acid | 10 to 40 |
| Lemon powder | 1 to 5 |
| Anti-caking agent | 1/4 to 2 1/2 |

It will be appreciated that all ingredients are of an edible character and of food grade specifications. In view of the lemon flavor, the product can be provided with a lemon yellow color, if desired, but this is optional. Preferably, the product is colored a lemon yellow, using an FDA approved vegetable dye or coal tar color.

The monosodium glutamate employed in my condiment composition is of food grade and in the crystalline form. The crystals may be of any degree of fineness but preferably within the range of about 35 to 65 mesh in size.

The quantity of monosodium glutamate employed ranges between about 53 and about 88 weight percent, constituting a major proportion of the finished product. In general, the quantity employed is dependent upon the proportions of other ingredients.

The most suitable form of citric acid used in my composition is in the anhydrous granular form. This form is the least hygroscopic of the commonly available forms of citric acid. Although other forms can be employed, this necessitates the use of a higher quantity of anti-caking agent, which is generally not preferred. In general, the quantity of citric acid employed in my composition ranges between about 10 and about 40 weight percent. The particular proportion selected is partly dependent upon the intensity of the lemon flavor to be imparted by the finished condiment composition. Thus, for example, if a greater level of lemon flavor is desired, a higher quantity of citric acid will be employed. I have found that when using 2% by weight of the lemon powder for the flavor described hereinafter, a good balance between the monosodium glutamate and the lemon flavor is achieved at about 30% by weight of citric acid.

The lemon powder flavor used in my condiment composition preferably consists of terpeneless lemon oil plus gum arabic plus an antioxidant combination such as butylated hydroxyanisole (BHA) plus butylated hydroxytoluene (BHT). The above mixture is spray-dried to form an entrapped lemon flavor wherein the lemon oil is encapsulated by a sphere of gum. This material is then diluted in a carrier such as lactose and the final product contains about 0.2% by weight of lemon oil. This type of flavor is believed necessary to yield an adequate shelf life to my condiment composition. Lemon powder flavors of the type described are available commercially, as for example, under the trade name Dolcoseal. The preparation of products of this type is described in "Food Processing," vol. 21, No. 6, pages 44 and 45.

The quantity of lemon powder that is used in my composition can vary between about 1 and about 5 weight percent, again depending upon the intensity of lemon flavor to be imparted by the finished composition.

The anti-caking agent employed in any condiment composition preferably is calcium stearate. However, other edible anti-caking agents such as tricalcium phosphate, magnesium stearate, calcium silicate, calcium-aluminum silicate and talc can be employed. The quantity of anti-caking agent employed is dependent primarily upon the amount and form of citric acid used. Thus, higher quantities of citric acid require larger amounts of anti-caking agent. About 1/2% by weight of calcium stearate is effective when the condiment composition contains about 30% of anhydrous granular citric acid. The proper proportions can be easily determined by simple tests.

The preferred condiment composition of this invention is a free-flowing solid, preferably colored lemon yellow, which consists essentially of an intimate, homogeneous mixture containing about 68% by weight of monosodium glutamate, about 30% by weight of anhydrous granular citric acid, about 2% by weight of lemon powder, and about 1/2% by weight of calcium stearate. Without the intention of being so limited, it is believed that the individual crystals of monosodium glutamate have adhered to them, by means of moisture in exceptionally small amount, smaller particles of the other ingredients. By virtue of the proportions and the manner in which they are combined, the product has an acceptable shelf life when packaged in conventional containers and held in ordinary shakers with recloseable tops. The product has been found to appreciably enhance the flavor of seafoods, salads, and vegetables of the type mentioned earlier herein when used at levels of one-half to two teaspoons per pound, depending upon the type of food and method of application. The product may be intimately mixed with the food during or after cooking, or it may be sprinkled on the surface just prior to eating. In either case, appreciable flavor enhancement results.

In the preparation of my condiment composition, I have found that there are several critical aspects to the method employed. The order in which the ingredients are added is critical. The lemon powder flavor must be added when the mix is almost dry to prevent liberation of the essential oil. That is, if the spray dried flavor is to retain its potency for the desired shelf life period, it is essential that contact with moisture be minimized during the manufacturing process. Further, the amount of water used is critical. In making a colored product which is preferred, water is necessary to develop the color. Even when coloring is not used, it is desirable to very slightly moisten the surface of the monosodium glutamate crystals to improve the adherence thereto of the other ingredients. Because the final product must be free-flowing, it is essential that the product leaving the final blending step be virtually dry. Excessive amounts of water will result in a wet product which will tend to harden and cake during subsequent storage. Although larger quantities of anti-caking agent may help to alleviate the problem, this is not desirable from the standpoint of the functionality of the finished product. I have found that the amount of water used in the mixing process, either for the development of color or to improve the homogeneous character of the final product should not exceed 4 ounces per 100 pounds of finished product. Thus, between 0 and 4 ounces of water per 100 pounds of finished product can be initially employed in preparing the material.

In general, the process of the present invention involves a method for producing a solid free-flowing condiment composition containing monosodium glutamate, citric acid, lemon powder, and an anti-caking agent, which comprises thoroughly mixing about ½ the required quantity of monosodium glutamate with a small quantity of water, said quantity of water not exceeding about 4 ounces per 100 parts of finished condiment composition; adding and thoroughly blending the remainder of the monosodium glutamate and all of the citric acid; adding the anti-caking agent and then the lemon powder to the mixture and thoroughly blending all of the ingredients.

Although various types of mixing equipment can be employed in my process, I prefer to use a ribbon blender since this type of mixer appears to produce a more homogeneous mixture of the solid ingredients in the shortest time without undue attrition. In general, mixing times and temperature are not critical. Room temperature is normally employed. It is essential, however, that thorough blending of the solid ingredients be achieved without undue attrition of the solid particles.

The following examples are intended to illustrate the underlying principles of my invention and are not to be construed as unduly limiting thereof.

EXAMPLE I

A solid yellow colored, free-flowing condiment composition was prepared containing the following ingredients in the amounts given.

Monosodium glutamate (crystalline) _____lbs__ 68
Citric acid (anhydrous granules) _____lbs__ 30
Lemon powder [1] (spray dried lemon oil with antioxidants) _____lbs__ 2
Calcium stearate _____lb__ ½
Lemon yellow color [2] _____gm__ 15
Water _____oz__ 3.5

[1] Available under the trade name Dolceseal Lemon.
[2] Available under the trade name FD & C Yellow Lemon Shade.

The composition was prepared by first dissolving the color in the water. About half of the monosodium glutamate (about 34 lbs.) was placed in a ribbon blender and while being slowly agitated, the color solution was added uniformly over the surface of the glutamate. Mixing was continued for about one minute or until full color was developed. Citric acid and the remainder of the monosodium glutamate were added to the mix and blending continued for about 2 minutes. The calcium stearate and then the lemon powder were added to the mix and mixing continued for an additional two minutes. The product from the blender was passed through a 10-mesh screen where small lumps were broken and then packaged and sealed. The product was a free-flowing solid.

EXAMPLE II

The condiment composition of Example I was used in the preparation of whitefish and compared with whitefish prepared in a different fashion, as will be more fully described hereinafter, by a consumer preference panel of thirty people selected at random. The whitefish was boned and 1½" squares were cut and prepared in three different ways, and deep-fried in fat at 370° F.

In sample No. 1, pieces were rolled in a mixture consisting of 85 grams yellow cornmeal
30 grams white flour
21 grams salt
10 grams of the condiment composition of Example I In sample No. 2, the pieces were dipped in fresh lemon juice and then rolled in a mixture consisting of 85 grams yellow cornmeal
30 grams white flour
21 grams salt
7 grams monosodium glutamate In sample No. 3, the pieces were dipped in fresh lemon juice and then rolled in a mixture consisting of 85 grams yellow cornmeal
30 grams white flour
21 grams salt The methods and preparations used in preparing samples Nos. 1 and 2 were designed to produce the same level of intensity of the lemon flavor. The members of the preference panel were asked to eat the pieces of fish and rate them on the basis of 1 to 10 points, 10 being the highest level of preference and acceptability. In the following table, the mean rating of each sample is based on a rating scale of 1 to 10 points, 10 being the highest and 1 being the lowest. The percent acceptability shows the total percentage of people who rated the products in the range of acceptability, viz., 6 to 10 points. The results of the testing by the preference panel are set forth in Table II below.

*Table II*

| Samples Compared | Sample No. 1 | | Sample No. 2 | |
|---|---|---|---|---|
|  | Mean Rating | Acceptance, Percent | Mean Rating | Acceptance, Percent |
| 1 v. 2 | 8.15 | 94 | 7.1 | 85 |
|  | Sample No. 1 | | Sample No. 3 | |
| 1 v. 3 | 7.85 | 97 | 7.13 | 91 |
|  | Sample No. 2 | | Sample No. 3 | |
| 2 v. 3 | 7.9 | 100 | 7.02 | 88 |

The above data indicate a statistically significant preference for sample No. 1, which employs the condiment composition of the present invention, over sample 2 prepared with fresh lemon juice and monosodium glutamate. This significance was rated at the 5% (or less) confidence level; that is, the probability of obtaining the above results strictly by chance under controlled test conditions is 5% or less. A similar preference was shown for sample No. 1 over sample No. 3. The data also show that the fish prepared with monosodium glutamate and fresh lemon juice rated higher than fresh lemon juice alone, but not to as high a degree of significance as when compared with the product prepared with the condiment composition of the present invention. This indicates that the pre-prepared combination of ingredients performed better than the separate ingredients.

While this invention has been described and exemplified in terms of its preferred embodiments, those skilled in the art will appreciate that modifications can be made without departing from the spirit and scope of the invention.

I claim:

1. A solid free-flowing condiment composition consisting essentially of a homogeneous mixture containing from about 53 to about 88 weight percent of monosodium glutamate, from about 10 to about 40 weight percent of citric acid, from about 1 to about 5 weight percent of lemon powder, and from about ¼ to about 2½ weight percent of an edible anti-caking agent.

2. A condiment composition according to claim 1 wherein said citric acid is in anhydrous granular form and said anti-caking agent is calcium stearate.

3. A condiment composition according to claim 1 wherein said citric acid is in anhydrous granular form and said anti-caking agent is tricalcium phosphate.

4. A condiment composition according to claim 1 wherein said citric acid is in anhydrous granular form and said anti-caking agent is magnesium stearate.

5. A condiment composition according to claim 1 wherein said citric acid is in anhydrous granular form and said anti-caking agent is calcium silicate.

6. A solid free-flowing yellow colored condiment composition consisting essentially of a homogeneous mixture containing about 68 weight percent of monosodium glutamate, about 30 weight percent of anhydrous granular citric acid, about 2 weight percent of lemon powder, and about ½ weight percent of calcium stearate.

7. A method for producing a colored, solid, free-flowing condiment composition containing as its essential components monosodium glutamate, citric acid, lemon powder, and an anti-caking agent, which comprises dissolving with an edible coloring agent in a small quantity of water, said quantity not exceeding ¼ part per 100 parts of finished condiment composition; agitating about 34 parts by weight of monosodium glutamate in a ribbon blender and slowly adding the aqueous colored solution uniformly over the surface of the monosodium glutamate, and mixing the same for about 1 minute to develop full color; adding 34 parts by weight of monosodium glutamate and 30 parts by weight of anhydrous granular citric acid to the mixture and continuing mixing for about 2 minutes; adding ½ part by weight of calcium stearate and then 2 parts by weight of lemon powder and mixing all of the ingredients for about 2 minutes; passing the material from the mixer through a 10-mesh screen to break lumps; and recovering a finished solid free-flowing condiment composition.

References Cited in the file of this patent

UNITED STATES PATENTS

| | | |
|---|---|---|
| 5,292 | Warren | Sept. 11, 1847 |
| 2,234,484 | Weinig | Mar. 11, 1941 |
| 2,812,258 | Wright | Nov. 5, 1957 |

OTHER REFERENCES

"Food Packer," July 1948, page 30.